G. W. BACON.
MAP, CHART, AND GEOGRAPHICAL DIAGRAM.
APPLICATION FILED MAY 4, 1912.
1,050,596.
Patented Jan. 14, 1913.
2 SHEETS—SHEET 1.
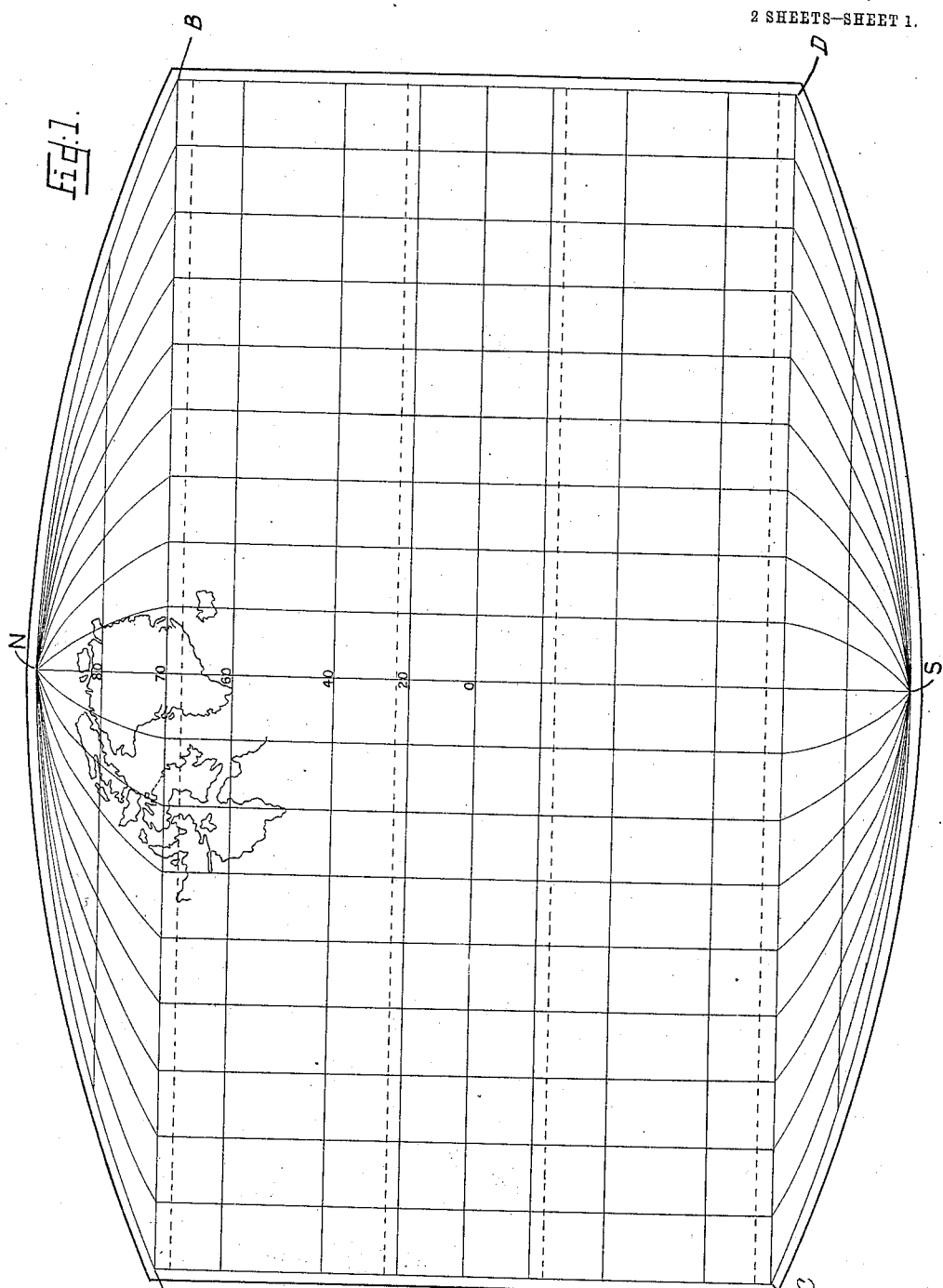
WITNESSES
INVENTOR
GEORGE WASHINGTON BACON
BY
ATTORNEYS

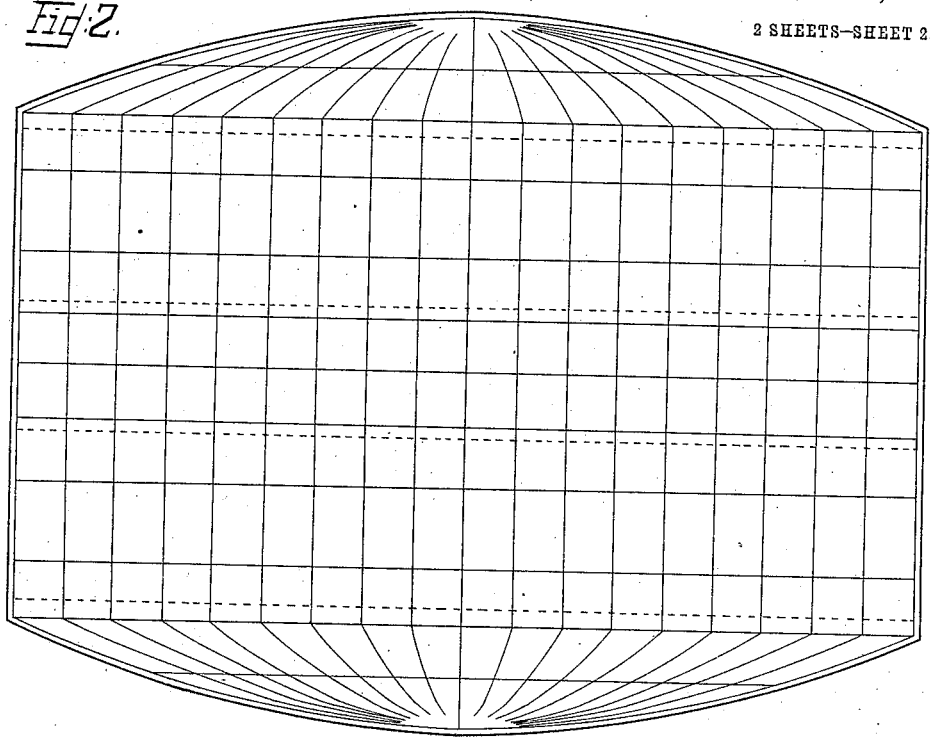
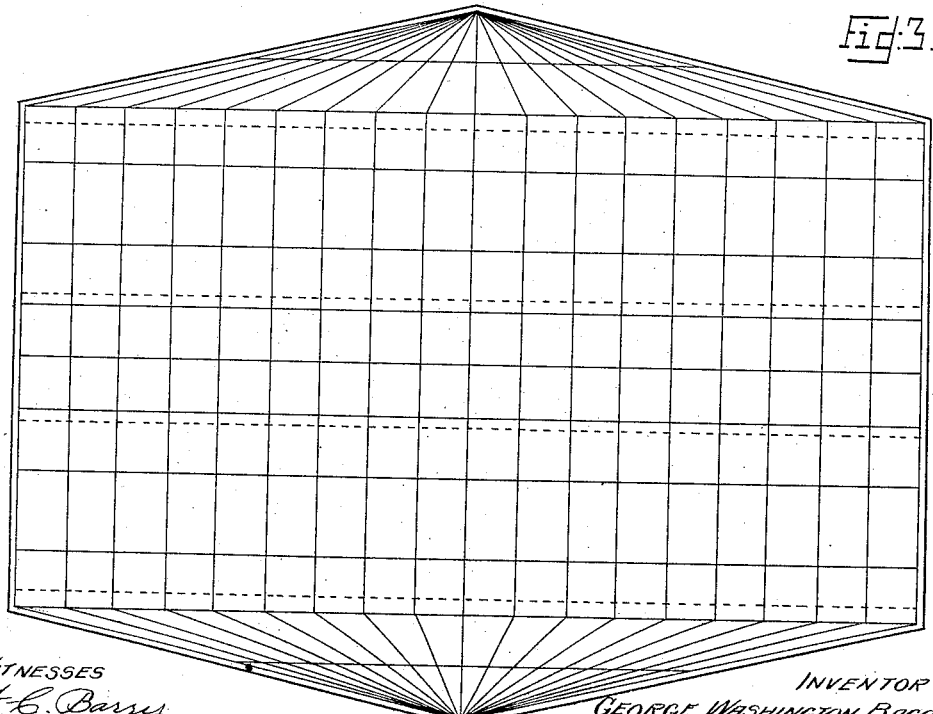

UNITED STATES PATENT OFFICE.

GEORGE WASHINGTON BACON, OF LONDON, ENGLAND.

MAP, CHART, AND GEOGRAPHICAL DIAGRAM.

1,050,596. Specification of Letters Patent. Patented Jan. 14, 1913.

Application filed May 4, 1912. Serial No. 695,068.

*To all whom it may concern:*

Be it known that I, GEORGE WASHINGTON BACON, a subject of the King of Great Britain and Ireland, and a resident of London, England, have invented certain new and useful Improvements in Maps, Charts, and Geographical Diagrams; and I do hereby declare the following to be a full, clear, and exact description of the same.

This invention refers to improvements in maps, charts, and geographical diagrams, whereby they are rendered more complete, useful and interesting.

The invention applies more particularly to those representations of the sphere which are constructed according to the systems of projection known as "cylindrical" or "Mercator's projection," or where the meridians of longitude are represented as straight parallel lines.

As it is impossible to represent the spherical surface of the globe upon a plane without some distortion, the various methods of projection in use in the construction of maps have been designed with a view to the distribution of this defect in a manner least objectionable for the particular purposes in view. The distortion manifests itself in a variation of scale and of shape of the different parts represented in the same map and is sometimes very considerable. Maps of the world constructed by cylindrical projection have the great advantage of representing a nearly complete and a connected view of the earth. The most common and useful of this class is Mercator's projection, which also possesses the special distinguishing quality of representing by a straight line any "rhumb" line, an indispensable requirement in charts used in navigation. But Mercator's projection has the drawback of producing a progressive increase of scale with increase of distance from the equator and this becomes in high latitudes so great as to give a very erroneous representation of similar areas and distances on the globe while the polar points cannot be shown by this form of projection, and therefore the circumpolar parts of the globe are omitted from this projection. Several attempts have been made to modify this defect as the "elliptical" (or "homalographic") projection in which both shape and scale are made subservient to equality of areas, but the principal objection to this projection is that the distortion is very great.

The invention is directed to the improvement of cylindrical or Mercator's projections of the sphere, and consists in delineating the circumpolar parts of the globe according to a system of projection to be described and the remaining parts of the sphere according to the Mercator's or the cylindrical systems and in such a manner that the two systems are adapted for combination in the same representation, map, or chart, and form together a continuous and connected representation of the entire surface of the earth or of those portions to which they are applied. By the application of the invention to the construction of maps developed from cylindrical projections of the sphere or parts thereof, the great exaggeration of scale which is inherent to those systems of projection is considerably modified.

The method of carrying out my invention as applied to a map of the world on Mercator's projection will now be more particularly described, with reference to the accompanying drawings, in which:—

Figure 1 represents the meridians of longitude and parallels of latitude for a map of the world constructed according to the invention, and shows a portion only of the topographical detail sufficient to illustrate the principles intended; Fig. 2 represents a "projection net" comprising the meridians of longitude and parallels of latitude for a map of the world, with curved convergent meridians of longitude; and Fig. 3 represents a "projection net" with straight convergent meridians of longitude; both constructed according to the invention and both illustrating the hereinbefore mentioned interval between the two systems of projection.

In carrying out the invention, a "projection net" for a proposed map is constructed by cylindrical projection, and the extent of latitude is limited preferably to the parallels of 70° north and 55° south. The central meridian line is then produced as far as the point assumed for the north polar point N. Fig. 1. This point is then connected with the northern terminations of the parallel meridians by means of straight or curved lines. These lines then represent continuations of the parallel meridians to the north polar point N. In a similar manner the said central meridian may be produced in the opposite direction as far as a point assumed for the south point S. Fig. 1, which is also connected in a similar manner with the southern terminations of the said parallel meridians by straight or curved lines.

The parallels of latitude between the polar points and the said limiting parallels of the cylindrically projected portion are represented by straight parallel lines. The appropriate geographical details are then filled in in their proper places. The determination of the position of either polar point is based upon the length of the radius of the primitive or original sphere from which the cylindrical part was developed. The distance of the polar point from the said limiting parallel being made equal to twice the length of said radius multiplied by the natural tangent of the complement of the latitude of the said limiting parallel =2 r. tan. co. lat. Similarly, the distance from the polar point of the point of intersection of any particular parallel of latitude with the said produced part of said central meridian is made equal to twice the length of said radius multiplied by the natural cotangent of the said particular latitude =2 r. cot. lat. This method has been found to be the most suitable but the invention is not confined entirely to one fixed method, as the points may be slightly varied without departing from the spirit of the invention.

A map constructed by this system virtually consists of a central portion of quadrilateral form A.B.C.D. Fig. 1, projected cylindrically, to which is attached two extensional or supplemental parts A.N.B. and C.S.D. projected convergently and extending to the north and south polar points respectively. Each extensional part is of the form of a triangle or of a circular segment according as the meridians on the same are represented as straight or curved lines respectively. Such a map viewed as a whole will represent all the meridians of longitude as straight parallel lines within the two chosen limiting parallels of latitude A.B. and C.D., but beyond these as straight or curved lines converging to the two polar points N. and S. At the junction between the said cylindrically projected part and the said convergently projected parts, a small interval or space may be left for the purpose, for example, of indicating the numbers representing the degrees of longitude, or the said parts may be placed in close juxtaposition so as to form a continuous whole.

In the claims the term "map," besides its ordinary signification, is intended to include a "projection net" without topographical matter thereon.

What I claim as my invention and desire to secure by Letters Patent is:—

1. A map in which the meridians of longitude are straight and parallel between certain parallels of latitude and are represented by projection from a sphere and in the higher latitudes are convergent toward the respective poles, the distance of either polar point from the respective limiting parallel of latitude being equal to twice the length of the radius of said sphere multiplied by the natural tangent of the complement of the latitude of said respective limiting parallel of latitude, substantially as described.

2. A map in which the meridians of longitude are straight and parallel between certain parallels of latitude and are represented by projection from a sphere and in the higher latitudes are convergent toward the respective poles, the central meridian of longitude being straight from end to end and terminated by the polar points, and the distance from the respective pole of the point of intersection of any particular higher parallel of latitude with said central meridian being equal to twice the length of the radius of said sphere multiplied by the natural cotangent of that particular latitude, substantially as described.

3. A map in which the meridians of longitude are straight and parallel between certain limiting parallels of latitude and in the higher latitudes are convergent toward the respective poles, the points of intersection of the converging portions of said meridians of longitude with the respective limiting parallels of latitude coinciding with the end points of said parallel portions of said meridians of longitude, substantially as described.

4. A map in which the meridians of longitude are straight and parallel between certain limiting parallels of latitude and in the higher latitudes are circular and convergent toward the respective poles, the points of intersection of the converging portions of said meridians of longitude with the respective limiting parallels of latitude coinciding with the end points of said parallel portions of said meridians of longitude, substantially as described.

In testimony whereof I affix my signture, in presence of two subscribing witnesses.

GEORGE WASHINGTON BACON.

Witnesses:
 ALFRED DAY,
 WALTER DAY.

Copies of this patent may be obtained for five cents each, by addressing the "Commissioner of Patents, Washington, D. C."